(12) United States Patent
Lin et al.

(10) Patent No.: US 7,883,181 B2
(45) Date of Patent: Feb. 8, 2011

(54) ATMOSPHERIC PLASMA INKJET PRINTING APPARATUSES AND METHODS FOR FABRICATING COLOR FILTER USING THE SAME

(75) Inventors: Chun-Hung Lin, Taipei (TW); Chia-Chiang Chang, Taipei County (TW); Chao-Kai Cheng, Miaoli County (TW); Chieh-Yi Huang, Hsinchu County (TW); Wan-Wen Chiu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 788 days.

(21) Appl. No.: 11/871,582

(22) Filed: Oct. 12, 2007

(65) Prior Publication Data
US 2008/0278540 A1 Nov. 13, 2008

(30) Foreign Application Priority Data
May 7, 2007 (TW) .............................. 96116088 A

(51) Int. Cl.
*B41J 2/14* (2006.01)
*B41J 2/16* (2006.01)

(52) U.S. Cl. .............................. 347/49; 347/21; 347/40
(58) Field of Classification Search .................. 347/20, 347/21, 40–43, 45, 95, 101, 104, 105
See application file for complete search history.

(56) References Cited

U.S. PATENT DOCUMENTS

| | | | |
|---|---|---|---|
| 5,573,682 A * | 11/1996 | Beason et al. ............ | 219/121.5 |
| 5,847,720 A | 12/1998 | Dunand | |
| 5,984,470 A | 11/1999 | Sakino et al. | |
| 6,145,981 A | 11/2000 | Akahira et al. | |
| 6,207,984 B1 | 3/2001 | Chang | |
| 7,399,051 B2 * | 7/2008 | Miyasaka ................. | 347/20 |

FOREIGN PATENT DOCUMENTS

| | | |
|---|---|---|
| JP | 2002-273869 | 9/2002 |
| JP | 2003-347048 | 5/2003 |

* cited by examiner

*Primary Examiner*—Thinh H Nguyen

(57) ABSTRACT

Atmospheric plasma inkjet printing apparatus and methods for fabricating color filters using the same. The atmosphere plasma inkjet printing apparatus includes a nozzle plate having a first column of nozzles and a second column of nozzles. An inkjet printhead module corresponds to the first column of nozzles. An atmospheric plasma module is corresponds to the second column of nozzles.

21 Claims, 11 Drawing Sheets

ATMOSPHERIC PLASMA INKJET PRINTING APPARATUSES AND METHODS FOR FABRICATING COLOR FILTER USING THE SAME

BACKGROUND OF THE INVENTION

1. Field of the Invention

The invention relates to inkjet printing apparatuses and fabrication methods for color filters using the same, and in particular to an atmospheric plasma inkjet printing apparatuses and fabrication methods for color filters using the same.

2. Description of the Related Art

Conventional front-end processes for fabricating thin film transistor liquid crystal display (TFT-LCD) devices includes fabrication of a color filter (CF) substrate, a thin film transistor substrate, a driver IC, a backlight module and liquid crystal materials. Among the production costs for conventional TFT-LCD devices, material costs account for about 60% to 70%. Particularly, costs of the color filter can reach almost ¼ of the total material cost of the TFT-LCD devices. As applications for TFT-LCD devices become wider and wider, demand for color filters also increases.

In order to solve defect problems during fabrication of pixellization structures such as color filters, pixel electrodes, black matrices, photo spacers etc., a method for fabricating the structure, for example, well known in fabrication of color filters using an inkjet printing system has been explained. Recently a new color filter fabrication method by inkjet printing has been developed, requiring a precisely controlled platform dispensing inkjet droplets on predetermined patterned pixel regions. The color droplets on the patterned pixel regions must not overflow to adjacent pixel regions to prevent color mixing. Moreover, the pattern and resolution of the color filters depend greatly on the nozzle interval of an inkjet printhead, resulting in increased fabrication complexity.

Conventional method for fabricating color filters includes forming color ink droplets directly on a color filter substrate confined within concavities defined by a black matrix (BM). Each color filter element is dispersed with different color ink droplets consisting of a red (R), a green (G) and a blue (B) color dots as a unit pixel. Compared with other conventional semiconductor fabrication methods, formation of a color filer using inkjet printing can dramatically reduce both equipment and production costs. Conventional inkjet printing, however, requires precise position alignment to ensure the ink droplet are dispersed at the predetermined position. Moreover, since it is difficult to uniformly diffuse the ink droplet within the concavities, defects such as white omission can be formed in the concavities.

To solve the above mentioned problems, conventional methods for fabricating a color substrate using inkjet printing provides an ink absorption layer in the concavities of the color filter substrate. The ink droplets are coated with a special arrangement which includes determining dimensions and locations of the ink droplets. Then, the ink droplets are diffused to desirable regions due to the high diffusion capability of the ink absorption layer. The conventional method can further incorporate an optical calibration alignment to provide more accurate and precise alignment.

However, formation of the ink absorption layer can increase production cost and fabrication process complexity. After the ink droplets are absorbed and diffused, white omission and color mixing can still exit between adjacent concavities, thereby severely deteriorating color filter quality. Furthermore, optical calibration alignment is achieved by decoding analogue signals, i.e., the printing location is determined by distributions of light passing through the concavities due to slot effect. Distributions of light can be affected by the relative location between the light source and charge coupled device (CCD), resulting in peak-to-valley shifts and affecting precision of determining the printing location.

U.S. Pat. Nos. 5,984,470, 6,145,981, 6,207,984, and 5,847,720, the entireties of which are hereby incorporated by reference, disclose inkjet printing apparatuses and fabrication methods for color filters. A precise platform is required to control ink droplets printed in a predetermined pattern. Note that the ink droplet must not diffuse to adjacent color elements during fabrication to prevent color mixing. The patterns and resolutions of the color filter must rely on the distance between printhead nozzles. Particularly, the printhead nozzles can be easily clogged due to dried ink.

FIG. 1 is a schematic view of a conventional fabrication method for a color filter using inkjet printing. A conventional inkjet printing apparatus 20 injects ink droplet 30 on a substrate 10 confined within concavities defined by a black matrix (BM) 12. If the substrate 10 is untreated by a surface treatment, the ink droplet 30 prints globular ink droplets due to surface tension and the hydrophobic surface. The globular ink droplets are more difficult to control. Thus, the dimensions and location of the globular ink droplets are unpredictable after being dried. For example, a convex ink droplet 30a can be formed at a pixel region due to strong surface tension, as shown in FIG. 2A. Alternatively, a concave ink droplet 30b can be formed at a pixel region due to weak surface tension, as shown in FIG. 2B. Furthermore, conventional untreated substrates can result in misalignment of the ink droplet 30c over the pixel regions resulting in color mixing, as shown in FIG. 2C.

Accordingly, a market demand for a surface treatment method to change surface characteristics such that surface tension between the ink droplet and the substrate can be reduced. The contact angle between the ink droplet and the substrate is less than 10° to form a flatten ink droplet in the pixel region, as shown in FIG. 2D. Furthermore, the ink droplet can further be self-aligned due to surface tension differences between adjacent heterogeneous regions.

BRIEF SUMMARY OF THE INVENTION

A detailed description is given in the following embodiments with reference to the accompanying drawings.

The invention provides an atmospheric plasma inkjet printer apparatus and fabrication methods for color filters using the same. A color filter is formed by inkjet printing synchronized with surface treatment by an atmospheric plasma apparatus such that the ink droplet as printed on the substrate can be self-aligned and uniformly diffused after hydrophobic/hydrophilic transformation is created by atmospheric plasma treatment. Real time calibration and alignment of location and dimensions of the ink droplet can thus be provided, further enhancing precise inkjet printing, reducing consumption of color ink, and improving fabrication yield.

Embodiments of the invention provide an atmospheric plasma inkjet printing apparatus, comprising: a nozzle plate having a first column of nozzles and a second column of nozzles thereon; an inkjet printhead module with at least one color ink source corresponding to the first column of nozzles; and an atmospheric plasma module corresponding to the second column of nozzles.

Embodiments of the invention also provide a fabrication method for a color filter substrate using an atmospheric plasma inkjet printing apparatus, comprising: providing a substrate; forming a patterned black matrix (BM) layer on the substrate defining a plurality of pixel regions; applying a color ink material on each pixel region using the inkjet printhead module of the atmospheric plasma inkjet printing apparatus; and performing surface treatment on the substrate using the atmospheric plasma module of the atmospheric plasma inkjet printing apparatus.

Embodiments of the invention further provide an atmospheric plasma inkjet printing apparatus, comprising: a nozzle plate having a first column of nozzles, a second column of nozzles, and a slot-shaped nozzle thereon; an inkjet printhead module with at least one color ink source connecting the first column of nozzles through a conduit; an atmospheric plasma module with a plasma source generating atmospheric plasma corresponding to the second column of nozzles; and an auxiliary atmospheric plasma module with the plasma source generating atmospheric plasma corresponding to the slot-shaped nozzle.

Embodiments of the invention further provide a fabrication method for a color filter substrate using an atmospheric plasma inkjet printing apparatus, comprising: providing a substrate; forming a patterned black matrix (BM) layer on the substrate defining a plurality of pixel regions; applying a color ink material on each pixel region using the inkjet printhead module of the atmospheric plasma inkjet printing apparatus; performing surface treatment completely on the substrate using the atmospheric plasma module of the atmospheric plasma inkjet printing apparatus; and performing surface treatment locally on each pixel region of the substrate using the auxiliary atmospheric plasma module of the atmospheric plasma inkjet printing apparatus.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention utilize atmospheric plasma to change surface characteristics of the color filter substrate such that an ink droplet printed at the pixel regions can be self-aligned, uniformly diffused, and used efficiently. More specifically, hydrophobic/hydrophilic transformation of the substrate is achieved by atmospheric plasma treatment, further enhancing more precise inkjet printing, reducing consumption of color ink, and improving fabrication yield.

Figure 1:
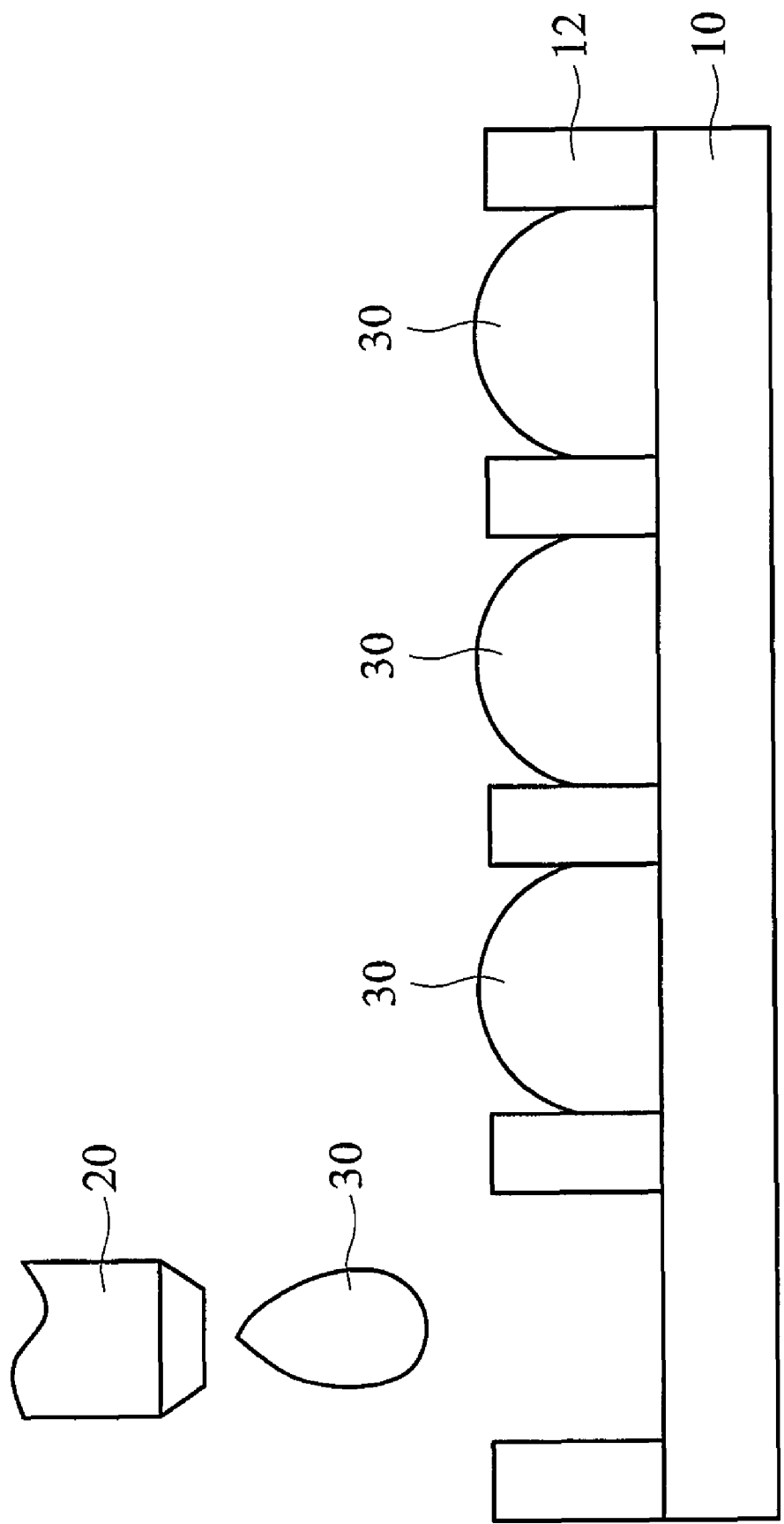
FIG. 1 is a schematic view of a conventional fabrication method for a color filter using inkjet printing.
Figure 2A:
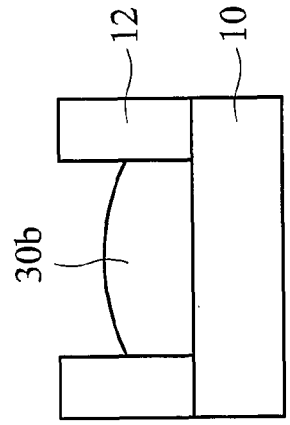
FIGS. 2A-2D are schematic views showing various undesirable formations of ink droplets on pixel regions.
Figure 2B:
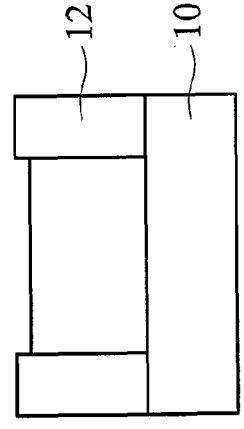
Figure 2C:
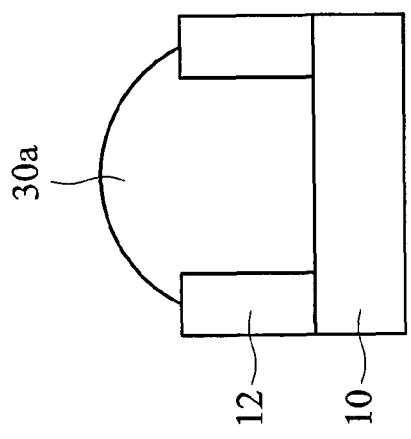
Figure 2D:
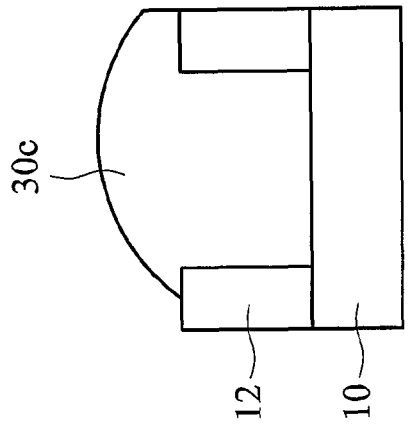
Figure 3:
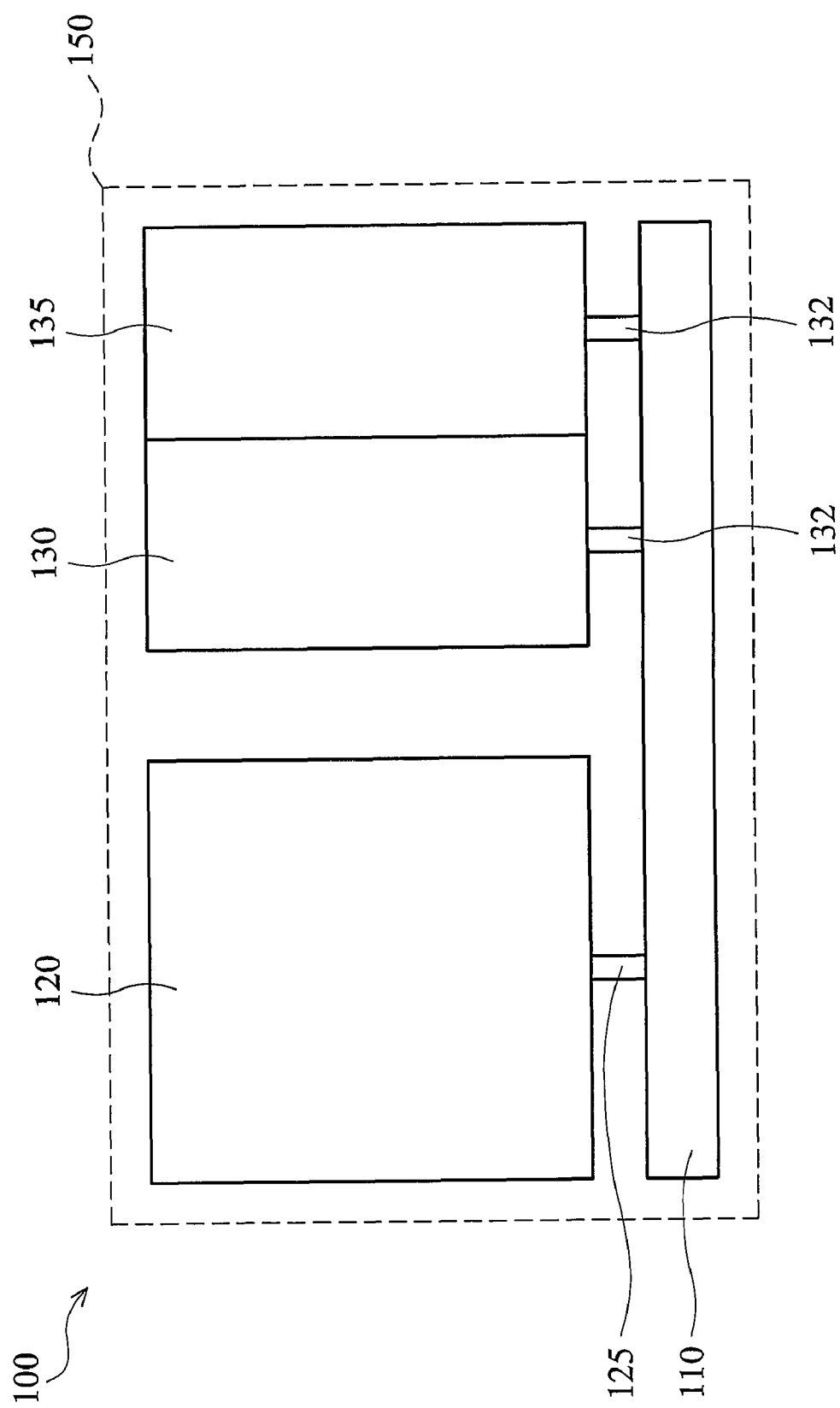
FIG. 3 is a schematic view of atmospheric plasma integrated with an inkjet printing apparatus according to an exemplary embodiment of the invention.

FIG. 3 is a schematic view of atmospheric plasma integrated with an inkjet printing apparatus according to an exemplary embodiment of the invention. Referring to FIG. 3, an atmospheric plasma inkjet printing apparatus 100 comprises a nozzle plate 110 with a first column of nozzles and a second column of nozzles thereon. An inkjet printhead module 120 with at least one color ink source connects the first column of nozzles through a conduit 125. An atmospheric plasma module 130 with a plasma source generating atmospheric plasma through a channel 132 corresponds to the second column of nozzles. The nozzle plate 110 further comprises a slot-shaped nozzle and an auxiliary atmospheric plasma module 135 corresponding to the slot-shaped nozzle. The atmospheric plasma inkjet printing apparatus 100 further comprises a frame 150 integrating the inkjet printhead module 120 with the atmospheric plasma module 130 and the auxiliary atmospheric plasma module 135. Alternatively, the inkjet printhead module 120 and the atmospheric plasma module 130 are independent from each other and operated separately.

Figure 4:
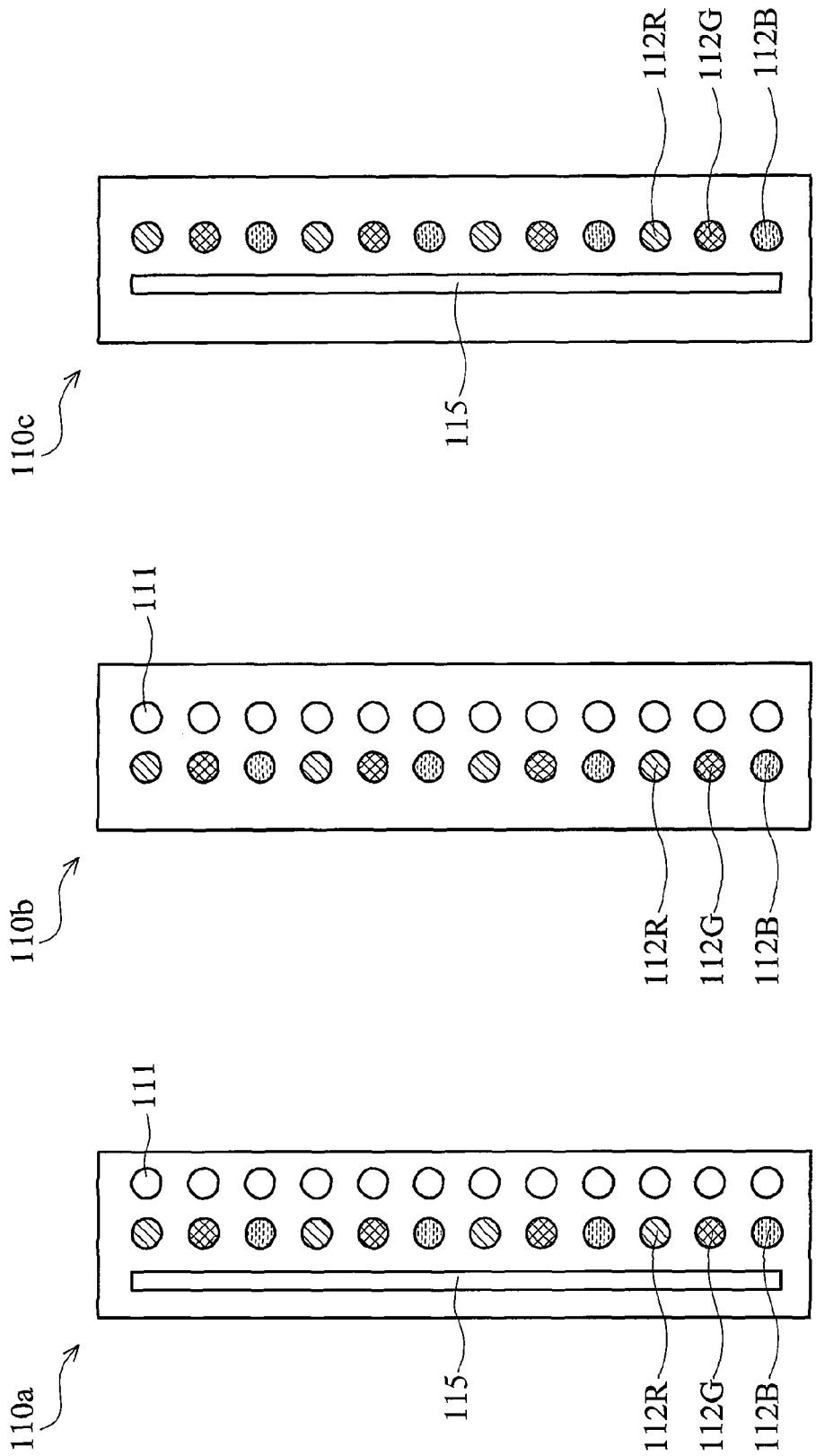
FIGS. 4A-4C are schematic views illustrating different embodiments of atmospheric plasma inkjet printing apparatuses.

FIGS. 4A-4C are schematic views illustrating different embodiments of atmospheric plasma inkjet printing apparatuses. Referring to FIG. 4A, a nozzle plate 110a includes a first column of nozzles 112R, 112G, 112B corresponding to a color ink source. The first column of nozzles 112R, 112G, 112B are disposed between the second column of nozzles 111 and the slot-shaped nozzle 115. The second column of nozzles 111 and the slot-shaped nozzle 115 are separately configured corresponding to an atmospheric plasma source. According to another embodiment of the invention, the second column of nozzles 111 can be disposed between the first column of nozzles 112R, 112G, 112B and the slot-shaped nozzle 115.

Referring to FIG. 4B, a nozzle plate 110b can alternatively include a first column of nozzles 112R, 112G, 112B corresponding to a color ink source, and a second column of nozzles 111 corresponding to an atmospheric plasma source. Further, referring to FIG. 4C, a nozzle plate 110c can alternatively include a first column of nozzles 112R, 112G, 112B corresponding to a color ink source, and a slot-shaped nozzle 115 corresponding to an atmospheric plasma source.

The atmospheric plasma sources of the embodiments of the invention can be driven by RF, VHF, DC, AC, or MV generators. Mixture of gases (e.g., CDA and He) and other gases (e.g., $O_2$, $N_2$ and $CF_4$) are excited to generate functional radicals such as O, N, OH, H, and F and thereby transform surface characteristics by surface treatment.

Figure 5:
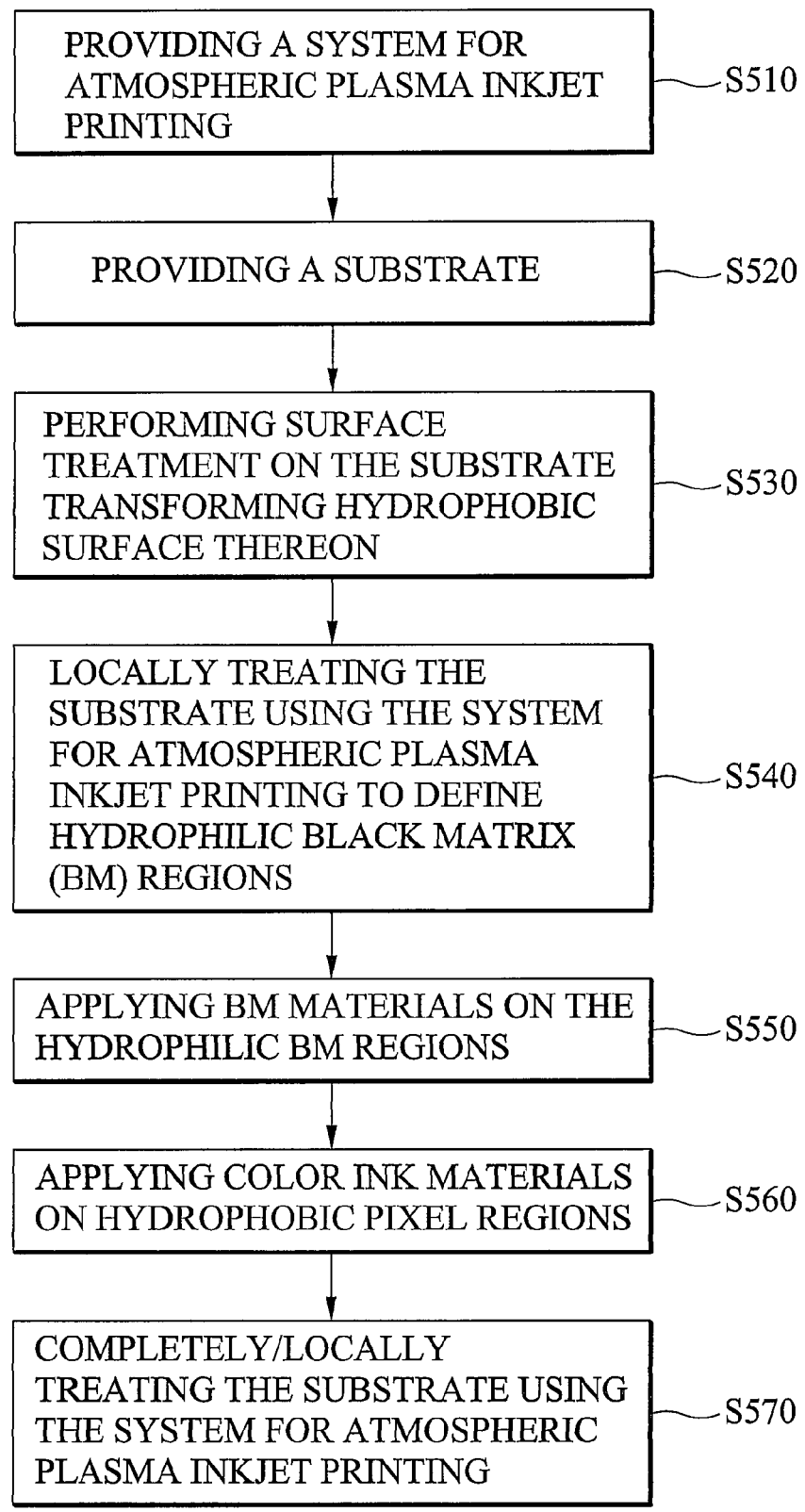
FIG. 5 is a flowchart of an exemplary embodiment of fabricating a color filter using the atmospheric plasma inkjet printing apparatus of the inventions.

FIG. 5 is a flowchart of an exemplary embodiment of fabricating a color filter using the atmospheric plasma inkjet printing apparatus of the invention. A system for atmospheric plasma inkjet printing is provided (S520), and a substrate for fabricating a color filter is then provided (S520). Next, a patterned black matrix (BM) is formed on the substrate defining a plurality of pixel regions. For example, an atmospheric surface treatment is completely performed on the substrate transforming a hydrophobic surface thereon (S530). The substrate is locally treated by the atmospheric plasma module of the system for atmospheric plasma inkjet printing to define hydrophilic black matrix (BM) regions (S540). The BM material is subsequently applied on the hydrophilic BM regions by the inkjet printer module of the system for atmospheric plasma inkjet printing (S550).

Subsequently, color ink materials are applied on the pixel regions by the inkjet printer module of the system for atmospheric plasma inkjet printing (S560). The substrate is completely treated by the atmospheric plasma module of the system for atmospheric plasma inkjet printing (S570). Alternatively, the substrate is locally treated by the auxiliary atmospheric plasma module of the system for atmospheric plasma inkjet printing (S570).

Figure 6A:
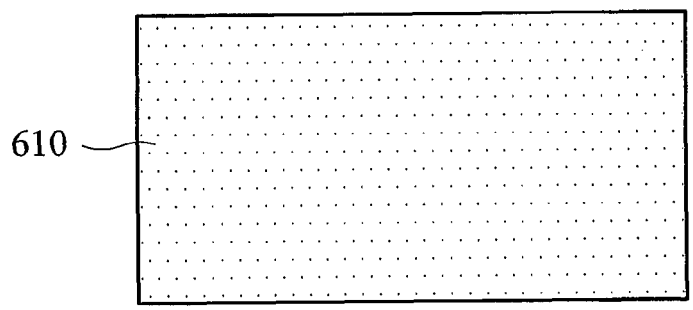
FIGS. 6A-6E are planar views of various embodiments of fabrication methods for color filters using the atmospheric plasma inkjet printing apparatuses of the invention.
Figure 6B:
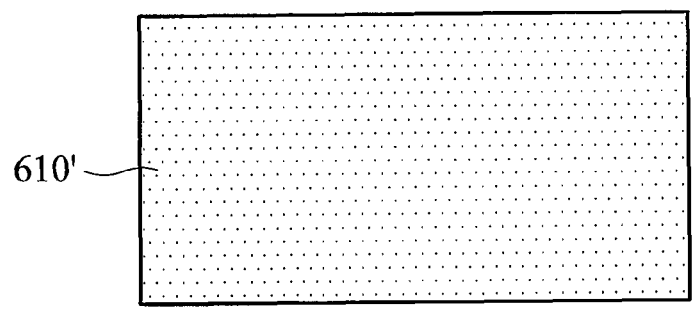

FIGS. 6A-6E are planar views of various embodiments of fabrication methods for color filters using the atmospheric plasma inkjet printing apparatuses of the invention. Referring to FIG. 6A, a substrate 610 for fabricating a color filter is provided. Then, an atmospheric surface treatment is completely performed on the substrate 610 transforming a hydrophobic surface 610' thereon, as shown in FIG. 6B.

Figure 6C:
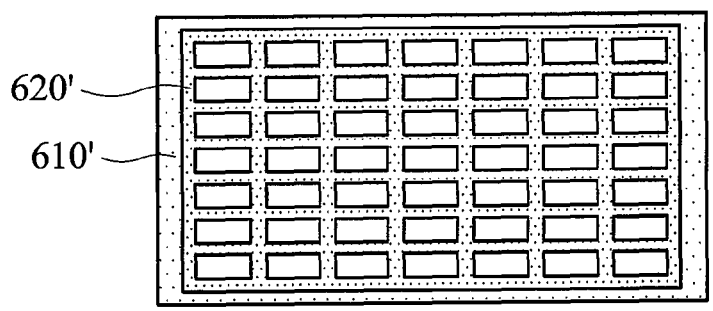
Figure 6D:
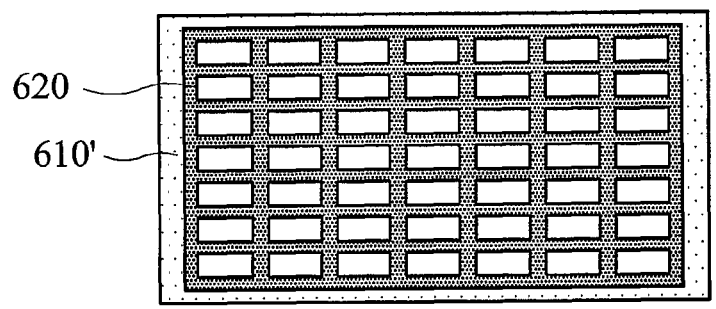

Referring to FIG. 6C, an atmospheric plasma surface treatment is locally performed on the substrate 610 defining patterned hydrophilic regions 620'. A system for atmospheric plasma inkjet printing comprises an atmospheric plasma module with a micro plasma nozzle in a diameter range about 5 to 200 μm. The BM material is subsequently applied on the hydrophilic BM regions by the inkjet printer module of the system for atmospheric plasma inkjet printing. Thus, a black matrix 620' is precisely and self-aligned formed on the substrate 610, as shown in FIG. 6D.

Figure 6E:
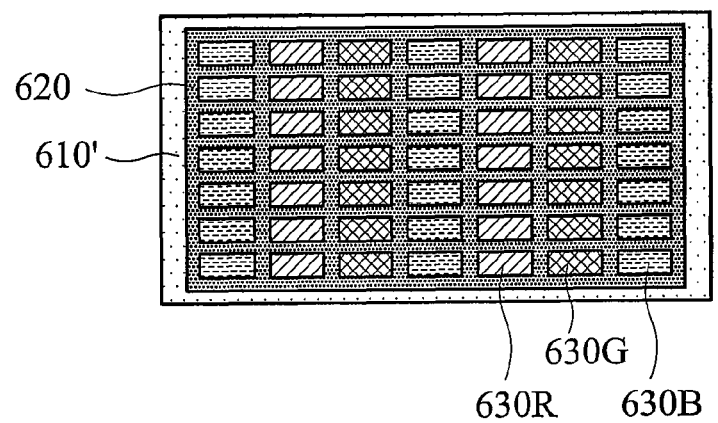

Subsequently, referring to FIG. 6E, a plurality of color ink materials are sequentially applied on the pixel regions 630R, 630G, 630B by the inkjet printer module of the system for atmospheric plasma inkjet printing. Optionally, a surface treatment is completely/locally performed using a linear plasma source on the color filter transforming a hydrophobic surface thereon.

Figure 7A:
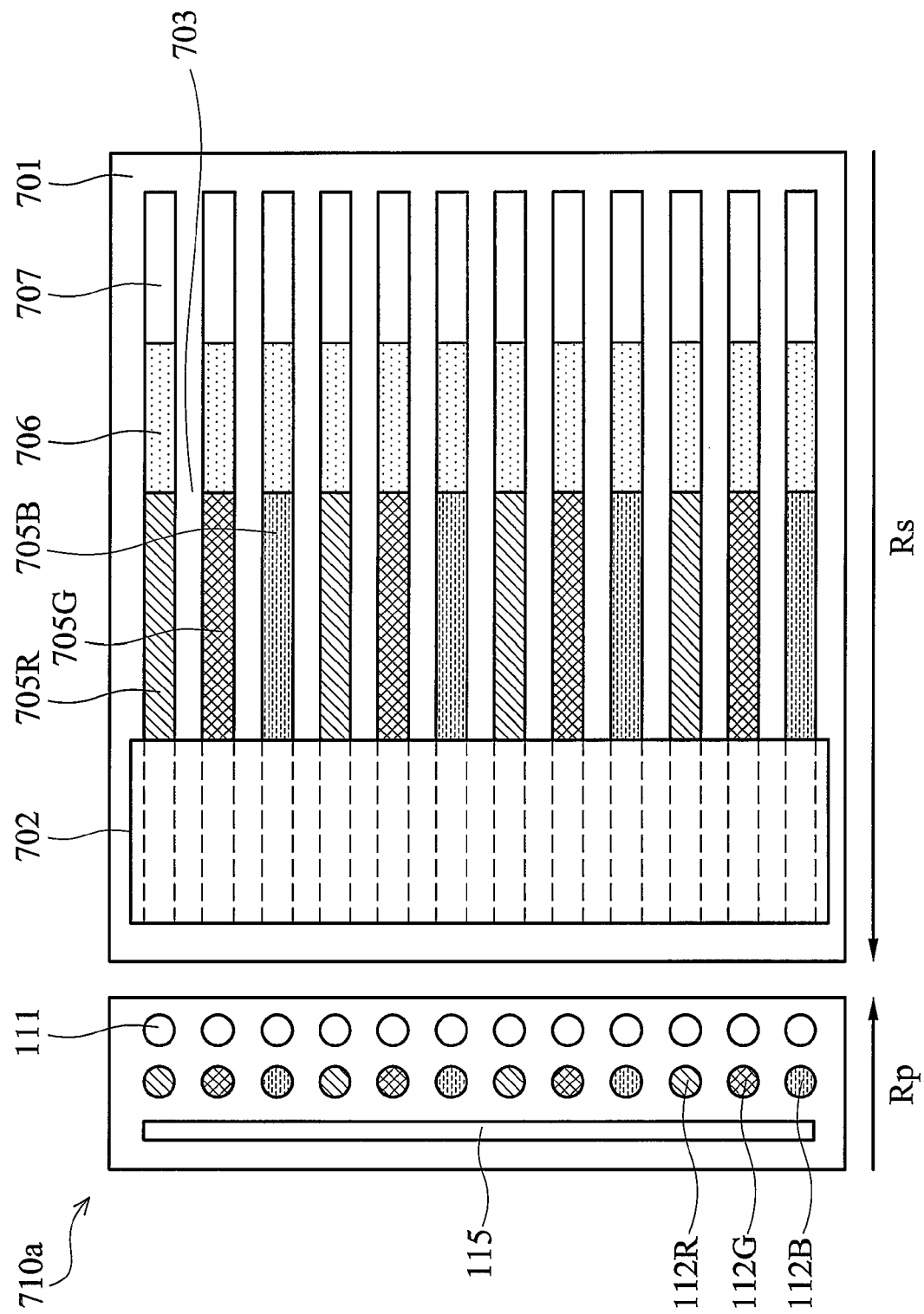
FIGS. 7A-7D show various embodiments illustrating relative motion between the atmospheric plasma inkjet printing apparatus and the color filter substrate.

FIGS. 7A-7D show various embodiments illustrating relative motion between the atmospheric plasma inkjet printing apparatus and the color filter substrate. Referring to FIG. 7A, the atmospheric plasma inkjet printing apparatus moves along direction Rp relatively to the motion direction Rs of the color filter substrate 701. The nozzles of pixel plasma module 111, the nozzles of inkjet printhead 112R, 112G, 112B, and a slot-shaped nozzle 115 of the linear plasma are respectively arranged on the nozzle plate 710a of the atmospheric plasma inkjet printing apparatus. The nozzles of pixel plasma module 111 is in line with the nozzles of inkjet printhead 112R, 112G, 112B parallel to the moving direction Rp of the atmospheric plasma inkjet printing apparatus. Therefore, the predetermined pixel regions 707 on the substrate 701 is treated by atmospheric plasma using the nozzles of pixel plasma module 111 before color inks are injected on plasma treated pixel region 706. The area 703 between pixel regions maintain original surface properties. A plurality of color ink materials are sequentially applied on the pixel regions 705R, 705G, 705B as demanded by nozzles of inkjet printhead 112R, 112G, 112B. Then, an atmospheric plasma surface treatment is completely performed using the slot-shaped nozzle 115 corresponding to a linear plasma source on the color filter substrate 701 as shown in region 702.

Figure 7B:
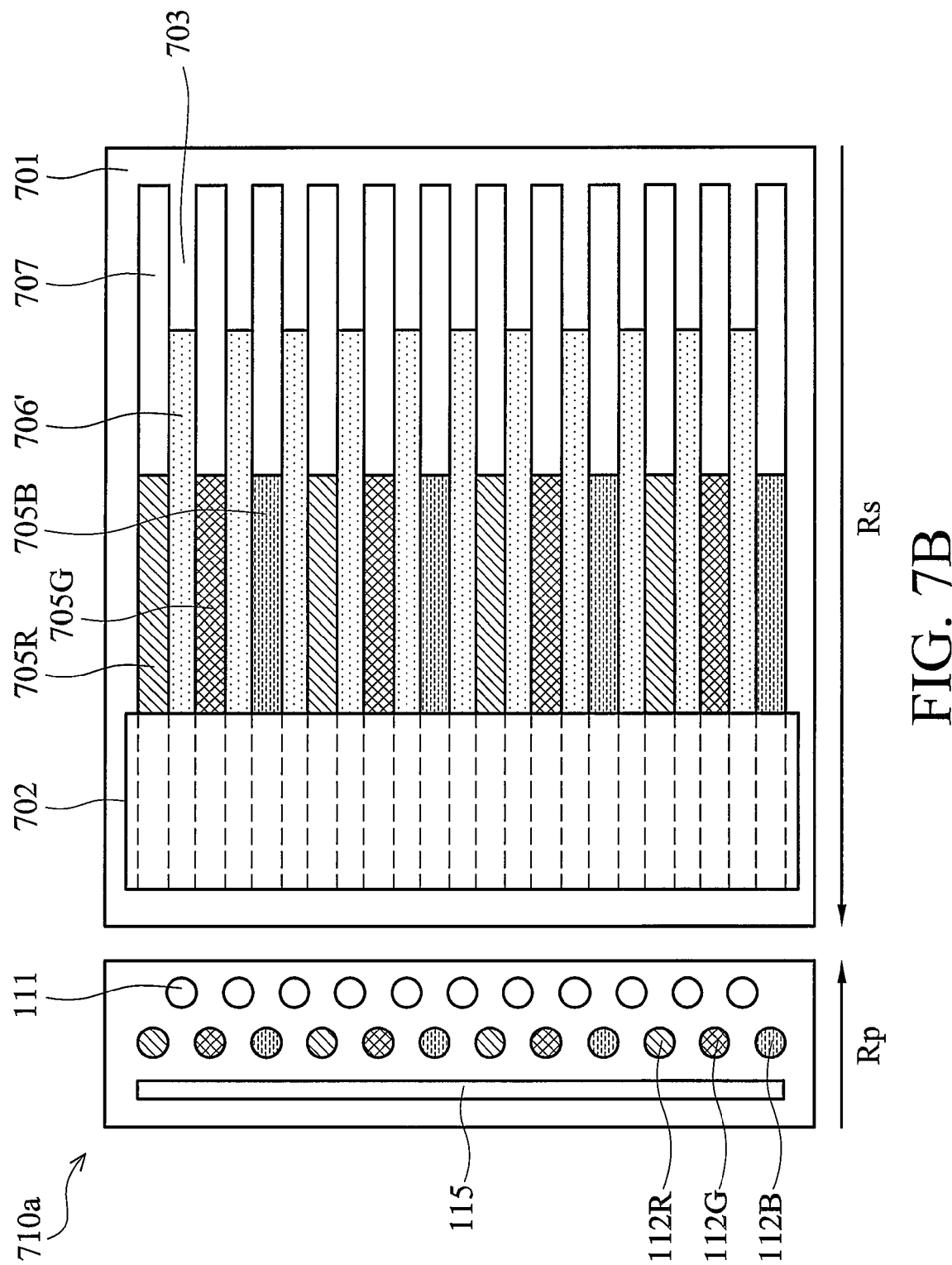

Alternatively, referring to FIG. 7B, the atmospheric plasma inkjet printing apparatus moves along direction Rp relatively to the motion direction Rs of the color filter substrate 701. The nozzles of pixel plasma module 111, the nozzles of inkjet printhead 112R, 112G, 112B, and a slot-shaped nozzle 115 of the linear plasma are respectively arranged on the nozzle plate 710b of the atmospheric plasma inkjet printing apparatus. The nozzles of pixel plasma module 111 is staggered with the nozzles of inkjet printhead 112R, 112G, 112B parallel to the moving direction Rp of the atmospheric plasma inkjet printing apparatus. Therefore, the predetermined non-pixel regions 706' on the substrate 701 are treated by atmospheric plasma using the nozzles of pixel plasma module 111 before formation of the color filter elements. A plurality of color ink materials are sequentially applied on the pixel regions 705R, 705G, 705B as demanded by nozzles of inkjet printhead 112R, 112G, 112B. Then, an atmospheric plasma surface treatment is completely performed using the slot-shaped nozzle 115 corresponding to a linear plasma source on the color filter substrate 701 as shown in region 702.

Figure 7C:
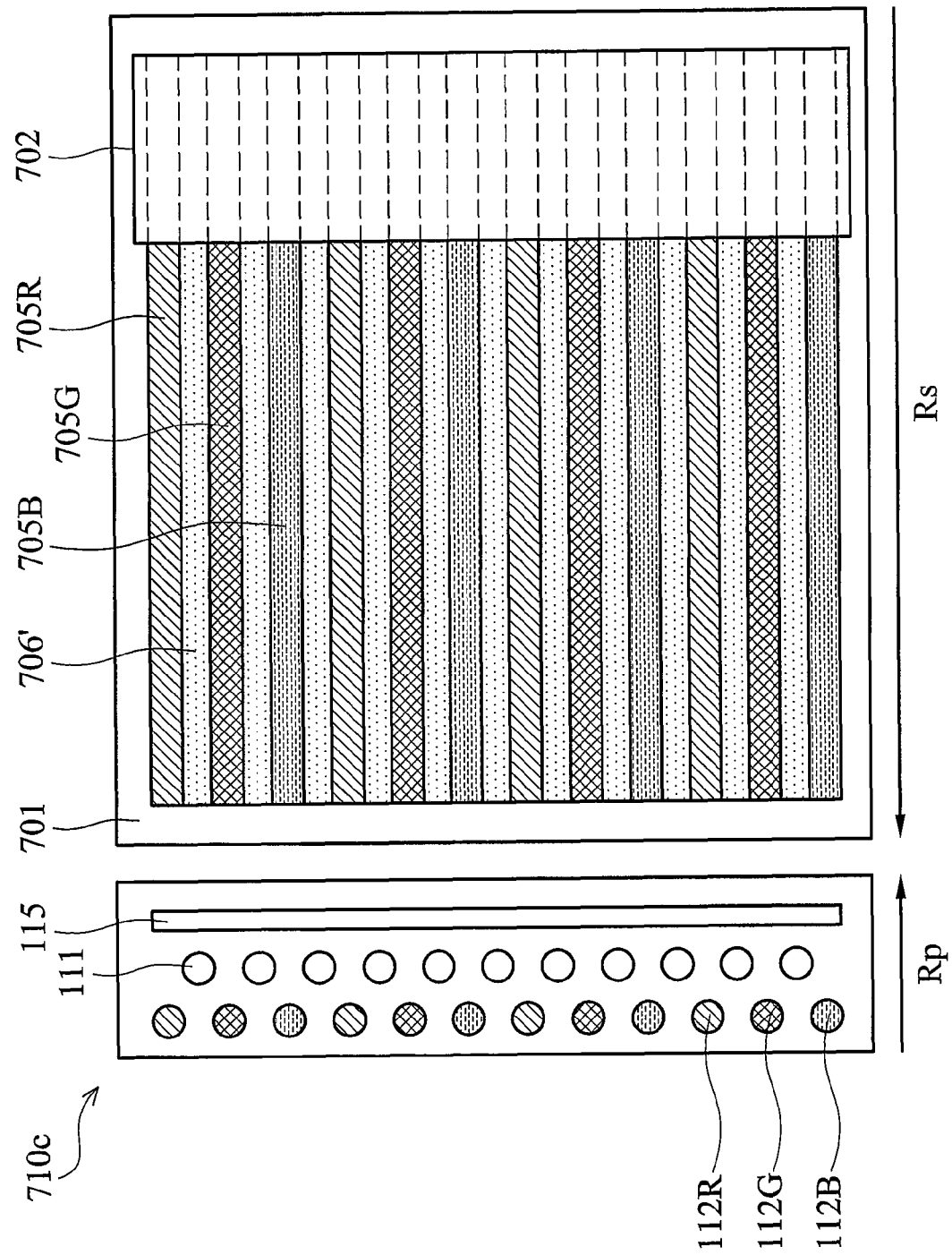

Alternatively, referring to FIG. 7C, the atmospheric plasma inkjet printing apparatus moves along direction Rp relatively to the motion direction Rs of the color filter substrate 701. The slot-shaped nozzle 115 of the linear plasma, the nozzles of the pixel plasma module 111, and the nozzles of the inkjet printhead 112R, 112G, 112B are respectively arranged on the nozzle plate 710c of the atmospheric plasma inkjet printing apparatus. The nozzles of pixel plasma module 111 is staggered with the nozzles of inkjet printhead 112R, 112G, 112B parallel to the moving direction Rp of the atmospheric plasma inkjet printing apparatus. Therefore, an atmospheric plasma surface treatment is completely performed using the slot-shaped nozzle 115 corresponding to a linear plasma source on the substrate 701 as shown in region 702. Then, the predetermined non-pixel regions 706' on the substrate 701 are treated by atmospheric plasma using the nozzles of pixel plasma module 111 before formation of the color filter elements. A plurality of color ink materials are sequentially applied on the pixel regions 705R, 705G, 705B as demanded by nozzles of inkjet printhead 112R, 112G, 112B.

Figure 7D:
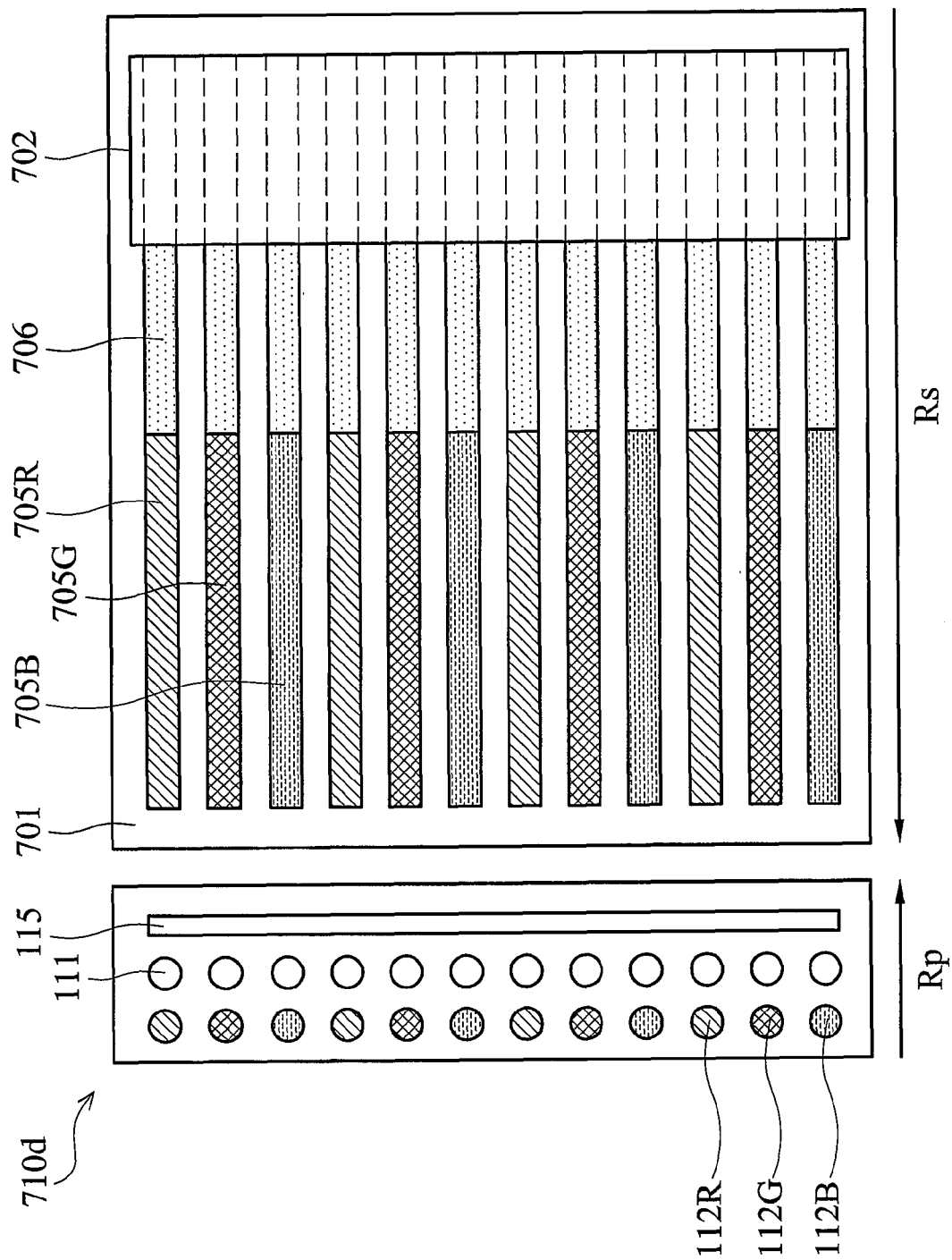

Alternatively, referring to FIG. 7D, the atmospheric plasma inkjet printing apparatus moves along direction Rp relatively to the motion direction Rs of the color filter substrate 701. The slot-shaped nozzle 115 of the linear plasma, the nozzles of pixel plasma module 111, and the nozzles of inkjet printhead 112R, 112G, 112B are respectively arranged on the nozzle plate 710d of the atmospheric plasma inkjet printing apparatus. The nozzles of the pixel plasma module 111 is in line with the nozzles of the inkjet printhead 112R, 112G, 112B paralleled to the moving direction Rp of the atmospheric plasma inkjet printing apparatus. Therefore, an atmospheric plasma surface treatment is completely performed using the slot-shaped nozzle 115 corresponding to a linear plasma source on the substrate 701 as shown in region 702. Then, the predetermined pixel regions 706 on the substrate 701 are treated by atmospheric plasma using the nozzles of pixel plasma module 111 before formation of the color filter elements. A plurality of color ink materials are sequentially applied on the pixel regions 705R, 705G, 705B as demanded by nozzles of the inkjet printhead 112R, 112G, 112B.

The abovementioned embodiments of the invention is disclosed by, but not limited to, fabrication methods for color filters using the atmospheric plasma inkjet printer apparatuses. Other patterning processes, such as applying patterned electrode and conductive lines or other micro-structure units on a substrate with predetermined patterns, can also be treated using the atmospheric plasma to locally transform hydrophobic/hydrophilic surface properties. The patterning processes can be achieved by inkjet printing. The ink droplets as printed on the predetermined treated region are uniformly dispersed, preventing ink diffusion to undesired regions. Since the ink droplets are self-aligned with the plasma treated regions, deviation of the patterning processes can also be prevented. After the patterned ink is formed on the substrate, atmospheric plasma can optionally be performed on the substrate such that the surface polarity of the patterned ink region is the same as that of the non-applied region, thereby enhancing more precise inkjet printing, reducing consumption of color ink, and improving fabrication yield.

Figure 8:
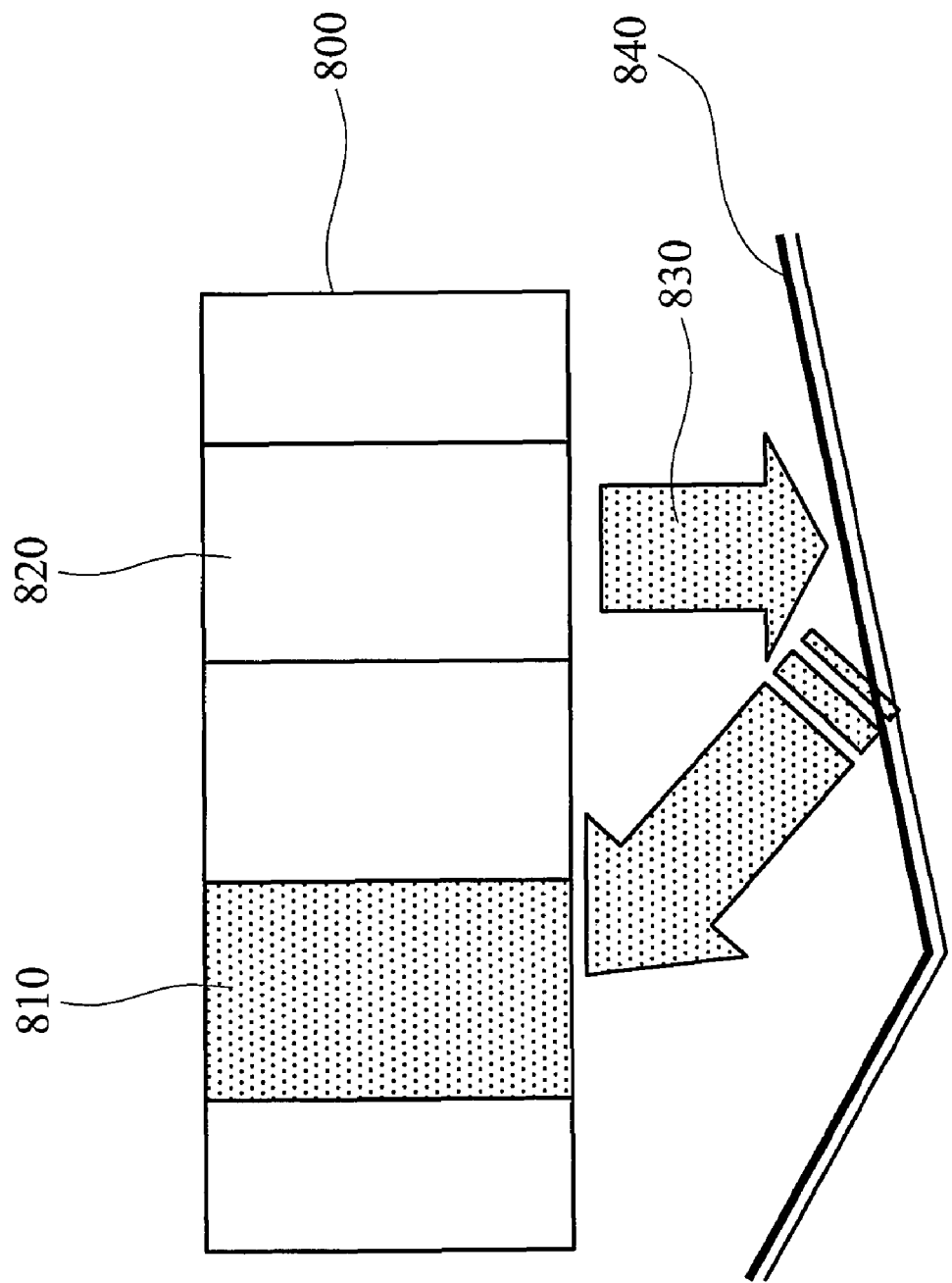
FIG. 8 is a schematic view of an exemplary embodiment of the atmospheric plasma inkjet printing apparatus consisting of an inkjet printer module and an atmospheric plasma module as an entity.

Moreover, according to embodiments of the invention, the plasma flow can also serve as a cleaning mechanism for the inkjet nozzle. Referring to FIG. 8, the atmospheric plasma inkjet printing apparatus 800 consists of an inkjet printer module 810 and an atmospheric plasma module 820 as an entity. The plasma flow 830 ejected from the atmospheric plasma module 820 is reflected by the substrate 840 towards the inkjet printer module 810. Therefore, the surface of the inkjet printer module 810 can be simultaneously cleaned by the reflected plasma flow 830, preventing the nozzle from becoming clogged in the inkjet printer module 810.

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An atmospheric plasma inkjet printing apparatus, comprising:
    a nozzle plate having a first column of nozzles and a second column of nozzles thereon;
    an inkjet printhead module with at least one color ink corresponding to the first column of nozzles; and
    an atmospheric plasma module corresponding to the second column of nozzles.

2. The atmospheric plasma inkjet printing apparatus as claimed in claim 1, further comprising a frame integrating the inkjet printhead module with the atmospheric plasma module.

3. The atmospheric plasma inkjet printing apparatus as claimed in claim 1, wherein the nozzle plate comprises a slot-shaped nozzle.

4. The atmospheric plasma inkjet printing apparatus as claimed in claim 3, further comprising an auxiliary atmospheric plasma module corresponding to the slot-shaped nozzle.

5. The atmospheric plasma inkjet printing apparatus as claimed in claim 3, wherein the first column of nozzles is disposed between the second column of nozzles and the slot-shaped nozzle.

6. The atmospheric plasma inkjet printing apparatus as claimed in claim 3, wherein the second column of nozzles is disposed between the first column of nozzles and the slot-shaped nozzle.

7. The atmospheric plasma inkjet printing apparatus as claimed in claim 1, wherein the first column of nozzles comprise a plurality of first nozzles, and the second column of nozzles comprise a plurality of second nozzles, wherein each first nozzle and each second nozzle are staggered respectively along a horizontal direction.

8. The atmospheric plasma inkjet printing apparatus as claimed in claim 1, wherein the first column of nozzles comprise a plurality of first nozzles, and the second column of nozzles comprise a plurality of second nozzles, wherein each first nozzle and each second nozzle are aligned respectively along a horizontal direction.

9. The atmospheric plasma inkjet printing apparatus as claimed in claim 1, wherein the atmospheric plasma module comprises a plasma source generating atmospheric plasma corresponding to the second column of nozzles, and wherein the atmospheric plasma inkjet printing apparatus further comprises an auxiliary atmospheric plasma module with the plasma source generating atmospheric plasma corresponding to a slot-shaped nozzle.

10. The atmospheric plasma inkjet printing apparatus as claimed in claim 9, further comprising a frame integrating the inkjet printhead module with the atmospheric plasma module.

11. The atmospheric plasma inkjet printing apparatus as claimed in claim 9, wherein the inkjet printhead module and the atmospheric plasma module are operated separately.

12. The atmospheric plasma inkjet printing apparatus as claimed in claim 9, wherein the first column of nozzles is disposed between the second column of nozzles and the slot-shaped nozzle.

13. The atmospheric plasma inkjet printing apparatus as claimed in claim 9, wherein the second column of nozzles is disposed between the first column of nozzles and the slot-shaped nozzle.

14. The atmospheric plasma inkjet printing apparatus as claimed in claim 9, wherein the first column of nozzles comprise a plurality of first nozzles, and the second column of nozzles comprise a plurality of second nozzles, wherein each first nozzle and each second nozzle are staggered respectively along a horizontal direction.

15. The atmospheric plasma inkjet printing apparatus as claimed in claim 9, wherein the first column of nozzles comprise a plurality of first nozzles, and the second column of nozzles comprise a plurality of second nozzles, wherein each first nozzle and each second nozzle are aligned respectively along a horizontal direction.

16. A fabrication method for a color filter substrate using an atmospheric plasma inkjet printing apparatus, comprising:
    providing a substrate;
    forming a patterned black matrix (BM) layer on the substrate defining a plurality of pixel regions;
    applying a color ink material on each pixel region using the inkjet printhead module of the atmospheric plasma inkjet printing apparatus as claimed in claim 9;
    performing a surface treatment completely on the substrate using the atmospheric plasma module of the atmospheric plasma inkjet printing apparatus; and
    performing a surface treatment locally on each pixel region of the substrate using the auxiliary atmospheric plasma module of the atmospheric plasma inkjet printing apparatus.

17. The fabrication method as claimed in claim 16, wherein formation of the patterned black matrix BM layer on the substrate comprises:
    performing an atmospheric plasma treatment completely on the substrate transforming a hydrophobic surface thereon;
    locally treating the substrate using the atmospheric plasma module of the atmospheric plasma inkjet printing apparatus to define hydrophilic BM regions; and
    applying a BM material on the hydrophilic BM regions using the inkjet printhead module of the atmospheric plasma inkjet printing apparatus.

18. A fabrication method for a color filter substrate using an atmospheric plasma inkjet printing apparatus, comprising:
    providing a substrate;
    forming a patterned black matrix (BM) layer on the substrate defining a plurality of pixel regions;

applying a color ink material on each pixel region using the inkjet printhead module of the atmospheric plasma inkjet printing apparatus as claimed in claim 1; and performing surface treatment on the substrate using the atmospheric plasma module of the atmospheric plasma inkjet printing apparatus.

19. The fabrication method as claimed in claim 18, wherein formation of the patterned black matrix (BM) layer on the substrate comprises:

performing an atmospheric plasma treatment completely on the substrate transforming a hydrophobic surface thereon;

locally treating the substrate using the atmospheric plasma module of the atmospheric plasma inkjet printing apparatus to define hydrophilic BM regions; and applying a BM material on the hydrophilic BM regions using the inkjet printhead module of the atmospheric plasma inkjet printing apparatus.

20. The fabrication method as claimed in claim 18, wherein the step of performing a surface treatment on the substrate comprises performing a surface treatment completely on the substrate.

21. The fabrication method as claimed in claim 18, wherein the step of performing surface treatment on the substrate comprises performing a surface treatment locally on each pixel region of the substrate.

* * * * *